Jan. 23, 1940.　　　　J. A. RHEINSTROM　　　　2,187,842
CONTAINER UNLOADING AND ROUTING MEANS
Filed Dec. 24, 1936

INVENTOR.
JAMES A. RHEINSTROM.
BY Allen & Allen
ATTORNEYS.

Patented Jan. 23, 1940

2,187,842

UNITED STATES PATENT OFFICE 2,187,842

CONTAINER UNLOADING AND ROUTING MEANS

James A. Rheinstrom, Cincinnati, Ohio, assignor to The Karl Kiefer Machine Company, Cincinnati, Ohio, a corporation of Ohio Application December 24, 1936, Serial No. 117,597

3 Claims. (Cl. 198—30)

My invention relates to means for taking heterogeneously arranged containers, causing them to move, and causing them to be arranged in files, together with means for facilitating the removal of containers from packing cases and placing the containers on the moving means. In this aspect of my invention, it may be regarded as a moving work table having means facilitating the reception of the containers, means for arranging the containers and means for delivering the containers to operating means. The operating means so far as this invention is concerned, do not constitute a limitation. They might be such means as are shown, by way of example, in my co-pending application Serial No. 85,137, filed June 13, 1936 and entitled Devices for handling containers. The means there shown are a washing means for bottles or cans. However, the devices herein claimed may be employed in connection with other mechanism operating upon containers, or may be employed to arrange containers in single file so that files of containers may be sent to separate operating instrumentalities.

To the extent that the moving and arranging means were described in my co-pending application, Ser. No. 85,137 referred to above, this application constitutes a continuation in part of that case.

I shall describe my invention in connection with a means for handling bottles or cans, it being understood however, that the containers which are treated in the exemplary embodiment of my invention, are illustrative only of one aspect of utility in my invention. My invention is of value and utility wherever articles to be handled are to be similarly arranged and similarly treated.

The general objects of my invention are the provision of new and improved means for facilitating the removal of articles from shipping cases and for arranging the said articles in a predetermined order and without locking and jamming during a movement of said articles, in a better, less complicated and more convenient way than heretofore.

These and the more specific objects of my invention which will be set forth hereinafter, or will be apparent to one skilled in the art upon reading these specifications, I accomplish by that certain structure and arrangement of parts of which I shall now describe the aforesaid exemplary embodiment. As to this, reference is made to the drawing wherein, Figure 1 is a top plan view of the unloading, conveying and arranging mechanism.

Figure 1:
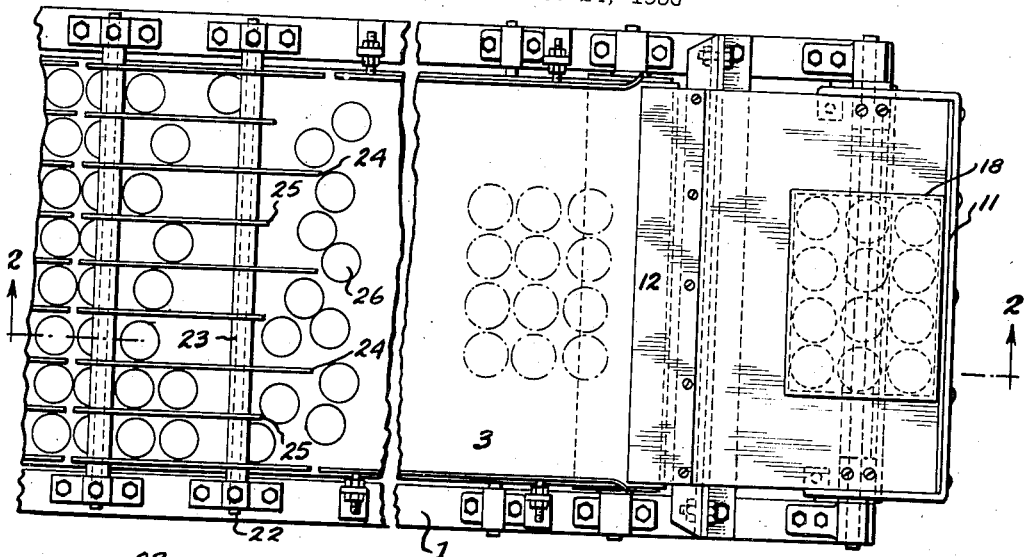

In the specific exemplary embodiment of my invention, I have shown a machine having a frame 1. On this frame there is mounted a conveyor 3. This conveyor may conveniently be of belt form, whether made of belting, wire mesh or the like, or it may be of any other suitable form, power driven or not, as desired. Of course, where the conveyor is power driven, the arrangement of the articles hereinafter to be described, will occur automatically. The conveyor, if of belt form, is of course, mounted upon suitable sheaves on shafts, such as the shaft 8 and whatever intermediate supports 9 as are desired will be provided, as is known in the art.

The conveyor provides an entering table upon which the cans, bottles or other containers or articles presenting similar problems, may be delivered.

In bottling works, cans and bottles are usually received in shipping containers designed for the ultimate shipment of the product, when the containers have been filled. It is a general practice to open the shipping cases from the bottom. One or more operators pulls the containers therefrom, the containers being in inverted position, turns the container right-side up and places them upon a work table, conveyor or the like. After the containers have been filled, they are returned to the same shipping case, the case sealed and the product shipped out. This method of unloading containers is slow, inconvenient and usually involves a great deal of stooping. In accordance with one of the objects of my invention, I provide a means for the ready removal of containers from the shipping cases, which will now be described in detail.

Beyond the conveyor 3 on the frame 1 of the machine, I provide a bracket 4, to which I pivot, by suitable means 5, another bracket 6. This bracket holds and supports a table having a flat-top 7 and an angularly bent end member 10. To strengthen the table, tie means 11 may be provided, riveted or otherwise fastened in place as desired. The table, by means of the pivoted structure aforesaid, can assume either the position shown in Fig. 2 or the position shown in Fig. 3. The table will be preferably as wide as the conveyor 3, excepting where, when containers are to be unloaded and placed upon a very wide conveyor, there may be a series of tilting tables arranged along the end face of the conveyor.

There will be as many of the bracket and pivot members 4, 5 and 6 along the length of the table as may be necessary to support it.

Figure 2:
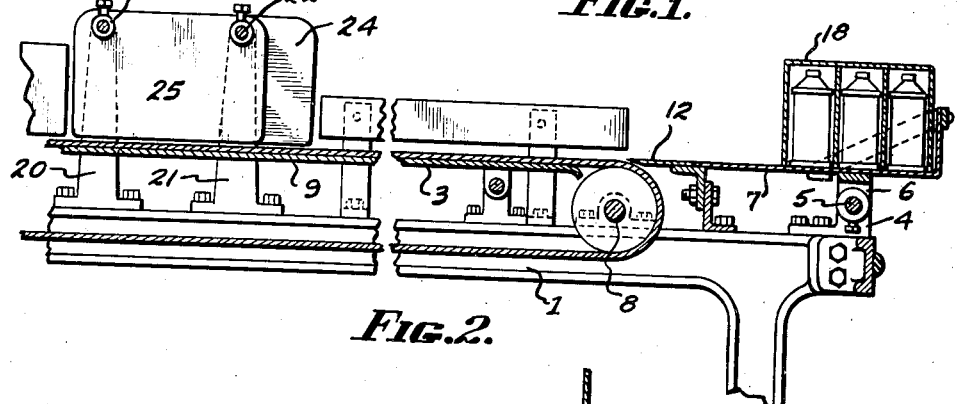
Fig. 2 is a sectional view thereof, taken along the lines 2—2 of Fig. 1.

At the forward end of the table top 7, when in the position shown in Fig. 2, I provide suitable supporting means, holding a supplementary fixed table 12. The supporting means in this instance, comprise an angle iron 13 bolted as at 14 to the frame 1, and an angle iron 15 bolted as at 16 to the first angle iron. The stationary table 12 is bolted or otherwise fastened to the angle iron 15, but as shown most clearly in Fig. 3, does not extend out to the corner thereof. On the contrary, there is a portion 17, which provides a shoulder on which the forward end of the table top 7 may rest when the tilting table is in the position shown in Fig. 2. When it is in this position, the tilting table top 7, the stationary table 12 and the top of the conveyor 3 are in substantial alignment, and articles placed upon the tilting table could be pushed over onto the conveyor without danger of tilting.

Figure 3:
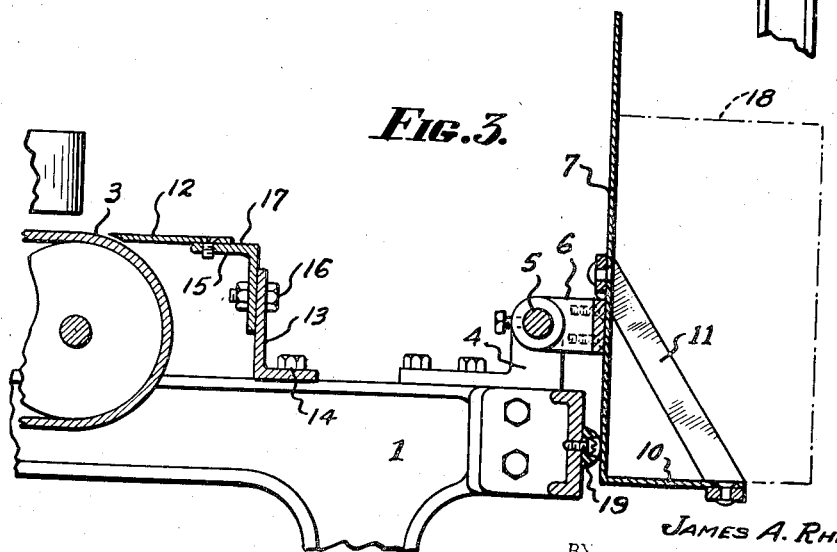
Fig. 3 is an enlarged sectional view, principally of the unloading means and showing these means in the initial position.

Instead of the tedious operation of unloading, which I have hitherto described, my tilting table makes it possible for the operator to open the bottom of a shipping case, bend the flaps back and, by a simple motion, push the open bottom of the shipping case horizontally against the table top 7 which is in the position shown in Fig. 3. The shipping case is shown in dotted lines at 18. It will not fall away from the table top 7, by reason of the angular extension 10. This extension is preferably reenforced by the member 11 which as indicated, extends along the upper edge thereof and may be riveted thereto.

When the shipping case has been placed in the position described, the operator pushes forwardly on the top of it, which causes the table to tilt into the position shown in Fig. 2, the shipping case 18 now being disposed horizontally and right-side up. The containers within it are also right-side up, and the bottom of the shipping case, as has been indicated, is open. The operator pushes forwardly on the shipping case (to the left in Fig. 2) and lifts the shipping case off of the containers. The containers remain on the tables 7 or 12 and may then be pushed forwardly onto the conveyor 3, or the containers can be carried onto the conveyor 3 while still in the shipping case, if desired. By the simple operations just described, the operator is able to unload at one time, the entire contents of the shipping case; and the articles in the shipping case are delivered right-side up upon the conveyor 3.

The reenforcement 11 may be heavy enough to cause the tilting table automatically to assume the position shown in Fig. 3, so that it is ready to receive the next shipping case and its containers; or, if desired, the tilting table may be otherwise counterweighted. A resilient stop means 19 may be provided on the frame 1 to take the jar of the tilting table when it swings to vertical position.

The containers or other articles have now been delivered to the conveyor 3 and will be moving forward upon this conveyor. One of the objects of the invention, as heretofore set forth, is to arrange the containers in single file on the conveyor so that they can be delivered to another conveyor or conveyors, moving in the same or in a transverse direction, or to operating mechanism such as cleaning, washing, or filling means. The containers will very likely be haphazardly arranged on the conveyor 3, especially if they have been pushed forward by hand after the removal of the shipping case.

I provide guide means, defining spaces for files of containers or other articles. The guide means comprise plates overlying the conveyor. These plates are held in place and are properly interspaced by suitable brackets 20 and 21 carrying rods 22, which pass through perforations in the plates.

Between the plates there are suitable spacers 23 which may be and preferably are in the form of hollow sleeves of requisite length surrounding the rods 22.

The cans or other containers approach the guide plates haphazardly on the conveyors and the guides serve to confine them to parallel files. A serious difficulty in mechanism of similar type has hitherto been encountered in the art, in that the haphazardly arranged containers on the conveyor tend to jam and lock against the guide plates. I have solved this problem in a simple way, by providing that adjacent plates meet the oncoming containers at different points. A convenient way of accomplishing this is by making the guide plates of different effective lengths. Thus in Fig. 1 a series of longer guide plates 24 alternate with a series of shorter ones 25. Approaching groups of containers therefore, cannot strike the ends of adjacent plates simultaneously and lock or jam against them; rather the longer plates striking certain ones of a group of containers tend to separate the group, and the individual cans, bottles or other containers are brought into the spaces between the guide plates smoothly. The individual articles or containers are shown at 26 in Figs. 1 and 2.

Modifications may be made in my invention without departing from the spirit thereof, and it will be understood that the particular embodiment herein described is exemplary only and is not a limitation upon my invention.

Having now described my invention what I claim as new and desire to secure by Letters Patent is:

1. In a device for the arrangement of files of containers, an entering table along which said containers are caused to move, and a series of thin guide plates for confining said containers to individual files as said containers pass therebetween, said guide plates terminating over said table at different effective distances from any line transverse to said table and being staggered, whereby said containers are prevented from jamming or locking against the ends of said guide plates.

2. In a device for handling articles, a moving conveyor on which said articles are placed, thin guide plates overlying said conveyor and located in the path of travel of said articles, and arranged to confine said articles to individual files thereof, the ends of said guide plates as respects any line transverse to said conveyor being staggered, and terminating at different effective distances, whereby said articles are prevented from jamming or locking against the ends of adjacent guide plates.

3. In a device for the arrangement of files of containers proceeding haphazardly along a conveyor, which containers cannot be vertically displaced, a conveyor on which said containers are caused to move, and a series of thin guide plates for confining said containers to a plurality of individual, slightly interspaced files as said containers pass therebetween, said guide plates terminating over said conveyors at different effective distances from any line transverse to said conveyor, whereby alternate ones of said guide plates meet said containers in advance of the remainder, and whereby said containers are prevented from jamming or locking against the ends of said guide plates, since a locked assembly of containers traveling along said conveyor will not be simultaneously contacted by the ends of adjacent guide plates.

JAMES A. RHEINSTROM.